Dec. 31, 1940.   H. D. GEYER   2,227,304

FLUID SEAL ASSEMBLY

Filed March 21, 1938

INVENTOR
HARVEY D. GEYER
BY
Spencer Hardman & Fehr
his ATTORNEYS

Patented Dec. 31, 1940

2,227,304

UNITED STATES PATENT OFFICE 2,227,304

FLUID SEAL ASSEMBLY

Harvey D. Geyer, Dayton, Ohio, assignor to General Motors Corporation, Detroit, Mich., a corporation of Delaware Application March 21, 1938, Serial No. 197,052

4 Claims. (Cl. 286—11)

This invention relates to devices for sealing fluids and is more particularly concerned with fluid seals used in connection with rotating shafts and the like.

One of the objects of the invention is to provide a fluid seal, for use with a rotating shaft and housing therefor, which comprises an annular sleeve disposed around the shaft and including two spaced flanges thereon, one of said flanges sealingly engaging the periphery of the shaft, due to the inherent resiliency of the flange, and the other of said flanges sealingly engaging a portion of the housing for the shaft, said second mentioned flange being relatively harder and of less resiliency than the remainder of the seal.

In carrying out the above object it is another object of the invention to utilize a spring acting between a portion of the shaft and a portion of the seal for urging the second mentioned flange into sealing engagement with the housing.

It is a further object, in some instances, to provide the second mentioned flange with ears that are disposed to cooperate with receiving slots associated with the shaft, thereby preventing relative rotation between the seal and the shaft.

In carrying out the above objects it is a further object to fabricate the sealing member from a resilient material, such as polymerized isoprene, polymerized "chloroprene," rubber or some other rubber-like material, and to effect the change in resiliency and hardness between the portions of the seal by control of the initial compound used in said portions.

In carrying out the above object it is a further object, in some instances, to include a substantial quantity of graphite in the mix used to fabricate the seal, said graphite preferably being localized in the relatively harder flange portion thereby reducing the frictional coefficient of said portion.

It is a still further object to fabricate the seal in two parts, one of said parts being of relatively softer and more resilient material than the other of said parts and then to either cement the parts together or vulcanize the parts together and thereby form a substantially unitary assembly.

Further objects and advantages of the present invention will be apparent from the following description, reference being had to the accompanying drawing wherein a preferred embodiment of the present invention is clearly shown.

Figure 1:
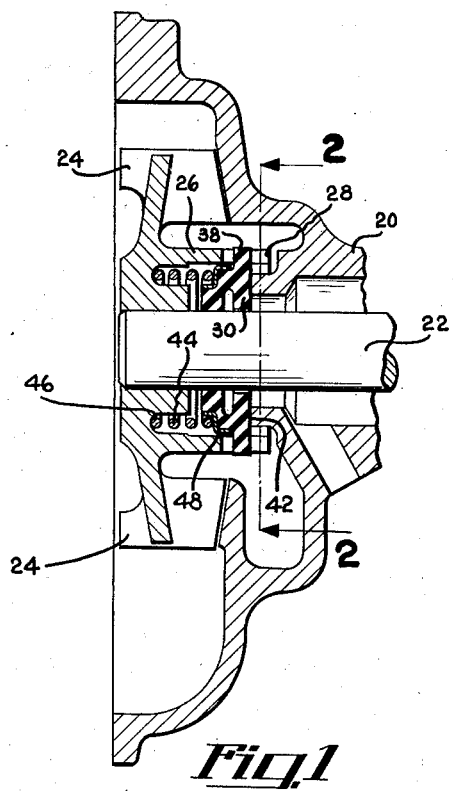
Fig. 1 illustrates a fragmentary sectional view of the present seal assembly in combination with an automotive water pump.
Figure 2:
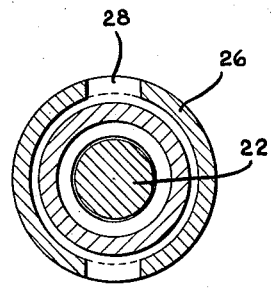
Fig. 2 is a section taken on line 2—2 of Fig. 1.

Referring to the drawing, 20 indicates a chambered pump housing which supports a bearing (not shown) for a shaft 22. Shaft 22 carries an impeller 24, at one end thereof, which is utilized to circulate water throughout the cooling system of an internal combustion engine. The impeller 24 includes a cup-shaped center portion 26 having two slots 28 in the side walls thereof, the function of which will be described hereinafter.

In order to prevent water in the pump housing from seeping along the shaft to the bearing and also to prevent grease from the bearing from seeping into the pump housing, a resilient fluid seal 30 is provided. Seal 30 includes an annular sleeve portion 32 and two spaced annular flange portions 34 and 36, preferably formed integrally with the sleeve 32. The flange 34 is of substantial thickness and has a hole therethrough which is of a smaller diameter than the diameter of the shaft 22. Thus when the seal 30 is slipped over the shaft 22 the flange 34 sealingly engages the surface of the shaft due to the inherent resiliency of the material used in the fabrication of the seal. Flange 36 has a somewhat larger diameter hole therethrough than the diameter of the shaft 22 and therefore preferably does not touch the shaft. In the present embodiment flange 36 is provided with two ear portions 38 thereon which extend outwardly beyond the major diameter of the flange 36 thereby functioning as keys within the slots 28 of the cup 26. The ears 38 prevent the seal 30 from turning relative to the shaft 22.

The outer surface 40 of flange 36 is disposed to bear and seal against a sealing surface 42 of the housing 20. In order to increase the sealing force thereon, a spring 44 is provided which fits in an annular groove 46 in the impeller 24 and bears against a portion of the seal 30, thereby urging the seal outwardly axially of the shaft and increasing the sealing force between sealing surfaces 40 and 42. A flanged washer 48 may be provided as a rest for the end of a spring 44 to prevent the spring from cutting into the seal

30, although this expedient is not necessary unless the spring pressure is high.

The method utilized in fabricating the seal 30 makes the same particularly applicable for its present use. Seal 30 is preferably formed from a resilient material such as polymerized isoprene, polymerized "chloroprene," rubber or some other resilient material. One of the features of the present invention resides in flange 36, which is harder and less resilient than the remainder of the seal 30. The difference between the physical characteristics of the flange 36 and the remainder of the seal 30 is accomplished by using compounds for the various portions of the seal that obtain different degrees of hardness in the same curing time. Thus the mold for the seal may be partially filled with one rubber-like compound which will cure to a definite hardness, the remainder of the mold may then be filled with a different compound that will cure to a lower degree of hardness. In this manner if the entire seal is cured for a definite period it is apparent that the first mentioned compound will be appreciably harder, thus a seal can be fabricated that includes portions of varying hardness. Simultaneously with the curing a vulcanized bond is effected between the portions of this seal.

Another expedient which may be carried out in order to obtain a similar final structure is to make the flange 34 and sleeve 32 integral and from a soft resilient material and the flange 36 out of a relatively harder and less resilient material and then cement and/or vulcanize the two parts together thus forming a substantially unitary assembly.

In some cases it is desirable to add a quantity of graphite to the mix of the material used in fabricating the seal 30 and it is preferable that this graphite be localized within the flange 36. Thus when the seal is in use the surface 40 of flange 36 is lubricated by the graphite. It is manifest that the graphite addition is not always necessary since the harder material in flange 36 inherently has a lower coefficient of friction than the softer material in the remainder of the seal and therefore slides easily over the sealing surface 42.

Figure 3:
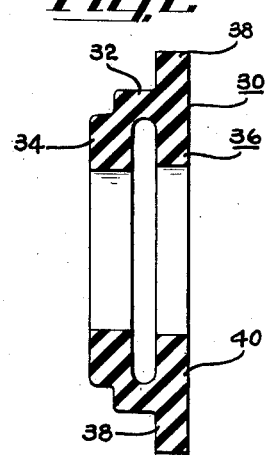
Fig. 3 is a sectional view illustrating the fluid seal which provides the subject matter of the present invention.
Figure 4:
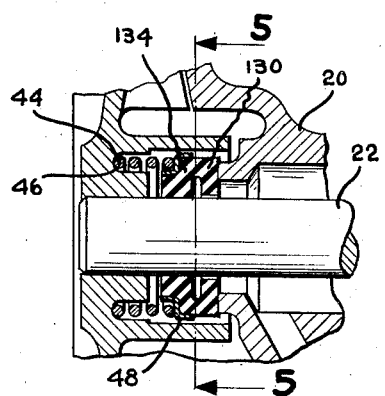
Fig. 4 is a fragmentary sectional view of a modified design of the seal as applied to an automotive water pump.
Figure 5:
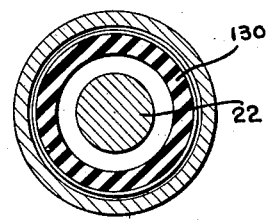
Fig. 5 is a sectional view taken on the line 5—5 of Fig. 4.

Fig. 4 illustrates a modification in the design of the present seal. In this embodiment a flange 134 is utilized in connection with a seal 130. The flange 134 is greater in thickness than the corresponding flange 34 in Fig. 3, which increases the area of contact, therefore grips the shaft 22 more firmly. In this embodiment therefore the ears 38, as shown in Fig. 3, may be eliminated since the flange 134 has sufficient gripping surface to hold the seal non-rotatable with respect to the shaft. The remainder of the seal assembly is similar to that already discussed in Fig. 1.

It is apparent that I have provided a very simple and effective fluid seal which is inexpensive to fabricate and easy to apply to any type of instrumentality wherein it is desirable to seal a rotating element from a stationary member.

Although the foregoing description has been limited to the application of a seal in connection with a water pump it is to be understood that the scope of the present invention is sufficiently broad to cover any type of application of the present seal.

When choosing the material from which the seal is to be fabricated it is important that the fluid to be sealed be taken into consideration. Thus when oil is one of the fluids to be sealed it is preferable to utilize the polymerized isoprene or "chloroprene," since this material is not deleteriously affected by oil.

While the embodiment of the present invention as herein disclosed, constitutes a preferred form, it is to be understood that other forms might be adopted, all coming within the scope of the claims which follow.

What is claimed is as follows:

1. A fluid seal assembly in combination with a rotatable element and a bearing housing therefor comprising, an annular resilient sleeve disposed about the element, a resilient integral flange at one end of said sleeve for gripping the periphery of the rotatable element and sealing the sleeve thereto in non-rotative engagement therewith, a second integral flange on said sleeve and out of contact with said element, said second flange being of relatively less resiliency than either the sleeve or first mentioned flange, and spring means bearing against a portion of the rotatable element for urging the second mentioned flange axially outwardly by extending said resilient sleeve against a portion of said bearing housing for sealingly engaging the flange to the bearing housing.

2. A fluid seal assembly in combination with a rotatable element and bearing housing therefore comprising, an axially extensible annular resilient sealing member disposed around said rotatable element and having a portion thereof sealingly engaging said rotatable element, a flange integrally formed with said sealing member and having a relatively lower degree of resiliency than the remainder of the sealing member, ears extending from the outer periphery of said flange, receiving means associated with said rotatable element for receiving said ears and thereby maintaining the sealing member non-rotatable with respect to the said element, and spring means acting between a portion of the rotatable element and the portion of the sealing member for urging said flange axially outwardly with respect to the remainder of the element for sealingly engaging the said flange with a portion of said housing.

3. A fluid seal in combination with two relatively moving parts comprising, an annular resilient axially extensible sleeve surrounding one of said parts, an integral resilient flange extending inwardly from said sleeve for sealingly engaging one of said parts, a second integral flange extending from said sleeve and sealingly engaging the other of said parts, said second flange being of relatively less resiliency than either the sleeve or the other flange, and means acting against the first mentioned relatively movable part and bearing upon said second mentioned flange for urging the second mentioned flange axially outwardly with respect to the first mentioned flange for increasing the sealing pressure of the second mentioned flange with said second mentioned relatively movable part.

4. In combination with a shaft and a bearing housing therefor of an axially extensible fluid seal comprising an annular sleeve of resilient material, spaced flanges disposed at opposite ends of said sleeve, one of said flanges having similar physical characteristics to the sleeve and the other said flange being relatively harder and less resilient than the rest of the seal, said resilient flange gripping said shaft peripherally when the shaft is passed through the flange and spring means acting on a portion of the shaft and bearing against the less resilient flange for urging the less resilient flange axially of the shaft and away from the said resilient flange.

HARVEY D. GEYER.